2,947,767

PROCESS FOR THE MANUFACTURE OF UNSATURATED ACIDS AND SALTS FROM β-LACTONES

Gaylord K. Finch and Charles D. Stringer, Kingsport, Tenn., assignors to Eastman Kodak Company, Rochester, N.Y., a corporation of New Jersey No Drawing. Filed Nov. 3, 1958, Ser. No. 771,209

4 Claims. (Cl. 260—414)

This invention relates to a method of treating β-lactones to obtain the metallic salts of unsaturated acids.

It has been known that various metallic salts of organic acids such as the salts of cobalt, iron, manganese and lead are useful in paints as paint driers. Other metallic salts such as the copper and mercury salts are useful as insecticides and wood preserving agents.

Methods heretofore used in the manufacture of driers involve the preparation of the water soluble acid salt from carboxylic acids and esters of animal, vegetable or mineral origin, followed by precipitation of the metal salt using the desired metal ion. The compounds thus produced were placed in a solvent for use.

Other procedures for drier preparations include the fusion method in which the metal oxide or free metal is fused at high temperature with the organic component, and the "in situ" manner where the organic component is supplied by the paint vehicle and the metal supplied as a reactive pigment.

We have discovered a method of making paint driers using β-lactones as the starting materials which also permits the formation of unsaturated acids.

One object of this invention is to provide a method of obtaining sodium salts of saturated and unsaturated acids from β-lactones. Another object of this invention is to provide paint driers of uniform composition which may be handled as a liquid solution in any desired metal concentration within the limits of practical considerations. A further object is to provide a method of converting the β-lactones into unsaturated acids.

The above objects are obtained by reacting a β-lactone having the following general formula:

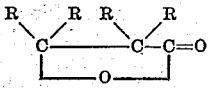

in which R represents either a hydrogen atom, a hydrocarbon, or a substituted hydrocarbon radical free of carboxylic groups. In addition the lactones may have from 3 to 12 carbon atoms. The β-lactone is reacted with an aqueous solution of alkali having a concentration of 5 to 70%. The preferred concentration is 10 to 30% using sodium hydroxide and vigorously agitating for ½ to 1½ hours at 50° to 100° C. A water solution is obtained of the sodium salt of an unsaturated organic acid. For instance, a salt of unsaturated acid may be obtained by reacting 4-ethyl-2,4-octadienoic acid lactone with a molar equivalent quantity of sodium hydroxide for about 1 hour at about 85° C.

In the event that another metal salt is desired, the water solution is reacted at 10–40° C. by vigorously agitating with a 2% to 15% excess of the desired inorganic metal salt, and 20–30% water solution until precipitation is complete. A solvent may be used in this step which may then require a separation to be made in which the bottom water layer containing inorganic salts is removed. In the absence of a solvent, the water insoluble metal organic salt is filtered or decanted and dried, if desired, then placed for use in whatever solvent is desired or may be transported and applied as paste or salt.

If a saturated salt is desired the reaction of the β-lactone with alkali is carried out under hydrogen pressure in the presence of Raney nickel catalyst. For instance, a saturated salt from a β-lactone having 3–12 carbon atoms having the following general formula:

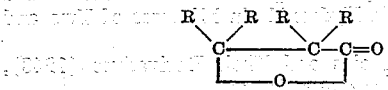

in which R is selected from the class consisting of hydrogen and alkyl groups is obtained by reacting the lactone with aqueous alkali at 50–100° C. and at the same time hydrogenating the reaction mixture under 40 atmospheres of hydrogen in the presence of an hydrogenation catalyst.

The temperature range of 50–100° C. is critical since a lower temperature merely acts to remove impurities from the lactones and can be used as a purification step in obtaining β-lactones. If higher temperatures are used a rapid reaction takes place between the alkali and the lactone which results in a di-basic acid salt instead of an unsaturated acid salt.

The following examples illustrate the practice of our invention but are not intended to limit it in any way.

*Example 1*

214 g. of crude 4-ethyl-3-hydroxy-4-octenoic acid, beta lactone (probably a mixture of beta, gamma and delta lactones) was reacted with 338 g. of 15% sodium hydroxide solution and vigorously agitated at 85° C. for ½ hour. One-half portion of the resulting clear solution of neutral salt was reacted with 80 g. cobaltous acetate, in a 30% water solution, and the remainder one-half of the product was reacted with 105 g. Pb(NO$_3$)$_2$, in 30% water solution. The precipitated metal salts were drained, filtered and dried in an inert atmosphere to give a high yield of both lead and cobalt salts. The lead and cobalt salts in 39.3% and 24.5% metal salt concentration, respectively, in xylene solution, were tested as driers in synthetic alkyd resin and linseed oil as film formers.

These were compared with no drier and with napthenate driers and found to be equal to, or superior to, naphthenates in all respects. The crude lactone for this experiment was derived from the condensation of 2-ethyl hexenal and ketene using a zinc catalyst.

*Example 2*

350 g. crude 4-ethyl-3-hydroxyoctanoic acid, lactone was reacted with 2.4 moles of 10% NaOH solution with vigorous agitation at 80° C. to give a yield of 99% to sodium 4-ethyl octenoate. One-half of the resulting solution was placed in a flask reactor with 1 liter of xylene and reacted with cobaltous nitrate (146 g. in 800 ml. water) whereupon the metal salt which formed was dissolved in xylene. The water was decanted and most of the xylene distilled off. Kerosene was added and the remainder of the xylene was distilled off leaving a good yield of cobalt 4-ethyl octenoate as an 8.1% cobalt metal concentration in kerosene. This metal salt was tested and found to be an excellent paint drier. In like manner a salt of lead, having 24.5% lead metal concentration as the C–10 metal salt in kerosene, was obtained and tested side-by-side with commercial naphthenate. The lead 4-ethyl octenoate drier was found superior to lead naphthenate as to skinning and compatibility and equal to the naphthenate on all other points which were compared.

*Example 3*

An experiment was carried out by reacting the semi-viscous lactone with sodium hydroxide under vigorous agitation for ½ hour at 25° C. followed by a further period of reaction of 1½ hours at 70° C. Otherwise this example was like Example 1 and gave respectively 36.4% and 36.2% cobalt and lead salts in xylene which proved to be superior paint driers.

*Example 4*

55.7 g. of sodium hydroxide (in 15% strength) was reacted with a crude semi-viscous lactone stock containing 234 grams of 4-ethyl-3-hydroxy-4-octenoic acid beta lactone by agitating and heating on the steam table to 70–80° C. for 1 hour. The resulting solution was clarified by passing it over a filter aid and then reacted with a solution of $Pb(NO_3)_2$ in water. The tan-colored precipitated lead salt was drained and filtered and assayed while damp. The purity, as 10-carbon lead salt, was 82%. This drier was dissolved in sufficient linseed oil to give a clear straw-colored viscous drier-oil solution containing 16.5 concentration of metal, as lead metal, by assay.

As indicated by the examples, the lactones which are operative in our invention may be used as crude reaction products obtained by the reaction of a ketene with an aldehyde or ketone as disclosed in U.S. Patent 2,356,459, issued August 22, 1944 to Kung. These lactone reaction product mixtures may also contain polymeric units due to the tendency of lactones to polymerize.

The metal salts obtained according to our invention are highly effective as paint driers possibly due to the activated type carrier afforded by the lactone. Metal salts obtained according to this invention are superior to similar concentrations of naphthenate driers as to compatibility and skinning, sedimentation dry time, resistance to whitening, film characteristics (touch) and absence of odor when tested both in natural oil and in synthetic alkyd resin film formers.

According to the process of this invention, the sodium or alkali metal salt is obtained due to the reaction of an aqueous alkali solution with the β-lactone. In order to obtain the unsaturated acid or saturated acid, the salt can be reacted with a suitable acid such as sulphuric, hydrochloric or the like to obtain the acid itself.

The particular metal salt which may be desired for use as a paint drier is a matter of choice. However, our preferred embodiments are the salts of cobalt, aluminum, calcium, lead, zinc or manganese.

We claim:

1. A method of obtaining salts of unsaturated acids from β-lactones comprising reacting a β-lactone having 3–12 carbon atoms having the following general formula:

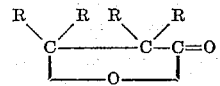

in which R is selected from the class consisting of hydrogen and alkyl groups with aqueous alkali at a temperature of 50–100° C.

2. A method of obtaining the salt of an unsaturated acid comprising reacting 4-ethyl-2,4-octadienoic acid lactone with a molar equivalent quantity of sodium hydroxide for about one hour at about 85° C.

3. A process of obtaining a saturated salt from a β-lactone having 3–12 carbon atoms having the following general formula:

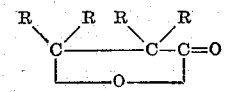

in which R is selected from the class consisting of hydrogen and alkyl groups comprising reacting the lactone with aqueous alkali at 50–100° C. and at the same time hydrogenating the reaction mixture under 40 atmospheres of hydrogen in the presence of an hydrogenation catalyst.

4. A process of obtaining metal paint driers from β-lactones having 3–12 carbon atoms having the following general formula:

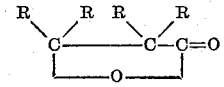

in which R is selected from the class consisting of hydrogen and alkyl groups comprising reacting the lactone with alkali at a temperature of 50–100° C. in water to form the alkali salt followed by reacting the alkali salt with an inorganic salt of a metal selected from the class consisting of cobalt, aluminum, calcium, lead, zinc and manganese.

References Cited in the file of this patent

UNITED STATES PATENTS

| | | |
|---|---|---|
| 2,585,223 | Caldwell | Feb. 12, 1952 |
| 2,681,291 | Ashley | June 15, 1954 |
| 2,849,457 | Holmquist | Aug. 26, 1958 |

OTHER REFERENCES

Chem. Abstracts, vol. 18, page 2497[2] (1924), article entitled "Beta-Bromosubstituted Acids and Beta-Lactones."

Chem. Abstracts, vol. 23, page 3393[9] (1929), article entitled "The Velocity of Saponification of Esters and Lactones by Sodium Hydroxide in Mixtures of Two and Three Solvents."

Ralston: Fatty Acids and Their Derivatives (1948), pp. 428 to 438 (page 436 relied on).

Wertheim: Organic Chemistry (1951), 3rd ed., pp. 190 and 275 relied on.